(12) United States Patent
Torok et al.

(10) Patent No.: US 9,064,495 B1
(45) Date of Patent: Jun. 23, 2015

(54) MEASUREMENT OF USER PERCEIVED LATENCY IN A CLOUD BASED SPEECH APPLICATION

(71) Applicant: Amazon Technologies, Inc., Reno, NV (US)

(72) Inventors: Fred Torok, Seattle, CA (US); Peter Spalding VanLund, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 13/889,277

(22) Filed: May 7, 2013

(51) Int. Cl.
*G10L 15/00* (2013.01)
*G10L 15/28* (2013.01)

(52) U.S. Cl.
CPC .................................... *G10L 15/28* (2013.01)

(58) Field of Classification Search
CPC ....... G10L 15/22; G10L 15/08; G10L 15/063; G10L 17/00; G10L 17/02; G10L 17/24; G10L 15/26; G10L 15/20; G06F 17/289; G06F 3/167; G06F 3/0488; B66B 13/26; G03B 17/00
USPC ......... 704/253, 200, 248, 231, 211, 275, 235, 704/236, 252, 260, 249, 243; 379/88.24
See application file for complete search history.

(56) References Cited

U.S. PATENT DOCUMENTS

| | | | | |
|---|---|---|---|---|
| 5,732,394 | A * | 3/1998 | Nakadai et al. | 704/255 |
| 6,604,073 | B2 * | 8/2003 | Yoda | 704/231 |
| 8,370,145 | B2 * | 2/2013 | Endo et al. | 704/255 |
| 2014/0081638 | A1 * | 3/2014 | Lopez et al. | 704/249 |

* cited by examiner

*Primary Examiner* — Charlotte M Baker
(74) *Attorney, Agent, or Firm* — Knobbe, Martens, Olson & Bear, LLP

(57) ABSTRACT

In some embodiments, a user device receives a voice signal corresponding to a user utterance. The user device may set a time marker corresponding to a point in time in the voice signal. The voice signal and the time marker may be transmitted to a server device. The server device may perform speech recognition using the voice signal. The server device may determine a time offset corresponding to a difference in time between an end point of the user utterance and a time associated with the time marker. The server device may determine a response to the user utterance. The server device may transmit the time offset and the response to the user device. The user device may use the time offset to determine a user-perceived latency between the end of the user utterance and a beginning of the response.

20 Claims, 6 Drawing Sheets

MEASUREMENT OF USER PERCEIVED LATENCY IN A CLOUD BASED SPEECH APPLICATION

BACKGROUND

Automatic speech recognition ("ASR") systems generally can convert speech into text. As used herein, the term "speech recognition" refers not only to the process of converting a speech (audio) signal to a sequence of words or a representation thereof (text), but also to using Natural Language Understanding (NLU) processes to understand and make sense of a user utterance. Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g., finding a podcast where particular words were spoken).

An ASR system may employ an ASR engine to recognize speech. The ASR engine may perform a search among the possible utterances that may be spoken by using models, such as an acoustic model and a language model. In performing the search, the ASR engine may limit its search to some subset of all the possible utterances that may be spoken to reduce the amount of time and computational resources needed to perform the speech recognition.

Early ASR systems were limited in that they had a small vocabulary, could recognize only discrete words, were slow, and were less accurate. For example, early ASR systems may recognize only digits or require the user to pause between speaking each word. As technology progressed, ASR systems were developed that are described as large-vocabulary, continuous speech recognition or LVCSR. LVCSR systems provided improvements over the early systems, including larger vocabularies, the ability to recognize continuous speech, faster recognition, and better accuracy. For example, LVCSR systems may allow for applications such as the dictation of documents. As the technology has improved and as computers have become more powerful, LVCSR systems have been able to handle larger and larger vocabularies and increase accuracy and speed.

As LVCSR systems increase in size, the ASR engine performing the search may have a more complicated task and may require a significant amount of computing resources and time to perform the search. Certain devices, such as smartphones, tablet computers, and others, may lack the computing resources necessary to perform LVCSR or other types of ASR. It may also be inconvenient or inefficient to provide the hardware or software necessary for ASR on certain devices. As an alternative to implementing ASR directly on unsuitable devices, an ASR engine may be hosted on a server computer that is accessible via a network. Various client devices may transmit audio data over the network to the server, which may recognize any speech therein and transmit corresponding text back to the client devices. This arrangement may enable ASR functionality to be provided on otherwise unsuitable devices despite their limitations.

In addition to transmitting corresponding text back to client devices, a server computer may transmit other forms of responses back to client devices based on the speech recognition. For example, after a user utterance is converted to text by the ASR, the server computer may employ a natural language understanding (NLU) process to interpret and understand the user utterance. After the NLU process interprets the user utterance, the server computer may employ application logic to respond to the user utterance. Depending on the translation of the user utterance, the application logic may request information from an external data source. In addition, the application logic may request an external logic process. Each of these processes contributes to the total latency perceived by a user between the end of a user utterance and the beginning of a response.

As an example, a user utterance may request information to make a flight booking. The user device can receive a voice signal corresponding to the user utterance and transmit it to a server computer. First, the server computer can use ASR on the voice signal to determine the text of the user utterance. Next, the server computer can use a NLU process to understand that the user request seeks information to make a flight booking. Application logic on the server computer may then contact one or more external servers to obtain information on the requested flight booking. After application logic on the server computer determines that flight booking information responsive to the user request has been received, the server computer can transmit the responsive flight booking information to the user device. The user perceives the total time between when the user finished uttering the request and when the user device receives the responsive flight information from the server computer as a user-perceived latency.

It would be advantageous to be able to measure the user-perceived latency. Measuring the user-perceived latency functions as a quality-control metric for the user experience. In addition, any deviation from expected values for the user-perceived latency could provide an early warning of a problem within the system. By receiving the early warning, steps can be taken to quickly identify and correct any problems, thereby improving user experiences.

However, measurement of the user-perceived latency poses a problem. To determine the user-perceived latency, a difference in time between the end of a user utterance and the beginning of a response may be computed. The user device can determine when it receives a response, but it cannot readily determine the time at the end of the user utterance, as ASR is performed by the server device. Further compounding the problem, the internal clocks on the client device and the server computer are likely not in sync.

Additional background information on ASR systems may be found in L. R. Rabiner and B. H. Juang, Fundamentals of Speech Recognition, Prentice-Hall, Englewood Cliff, N.J., 1993; F. Jelinek, Statistical Methods for Speech Recognition, MIT Press, 1997; X. Huang, A. Acero, H.-W. Hon. Spoken Language Processing, Prentice Hall, 2001; D. Jurafsky and J. Martin, Speech and Language Processing (2nd edition), Prentice Hall, 2008; and M. Gales and S. Young, The Application of Hidden Markov Models in Speech Recognition, Now Publishers Inc., 2008; which are incorporated herein by reference in their entirety.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to measurement of a user-perceived latency on a user device in a system in which ASR is performed on a server device. Although much of the discussion herein is phrased in terms of servers, techniques of the present disclosure may be used by various kinds of execution resources, including computing devices, virtual machines, processors, processor cores, logical processes, threads, or the like.

System Setup—User Device and Cloud Device

Figure 1:
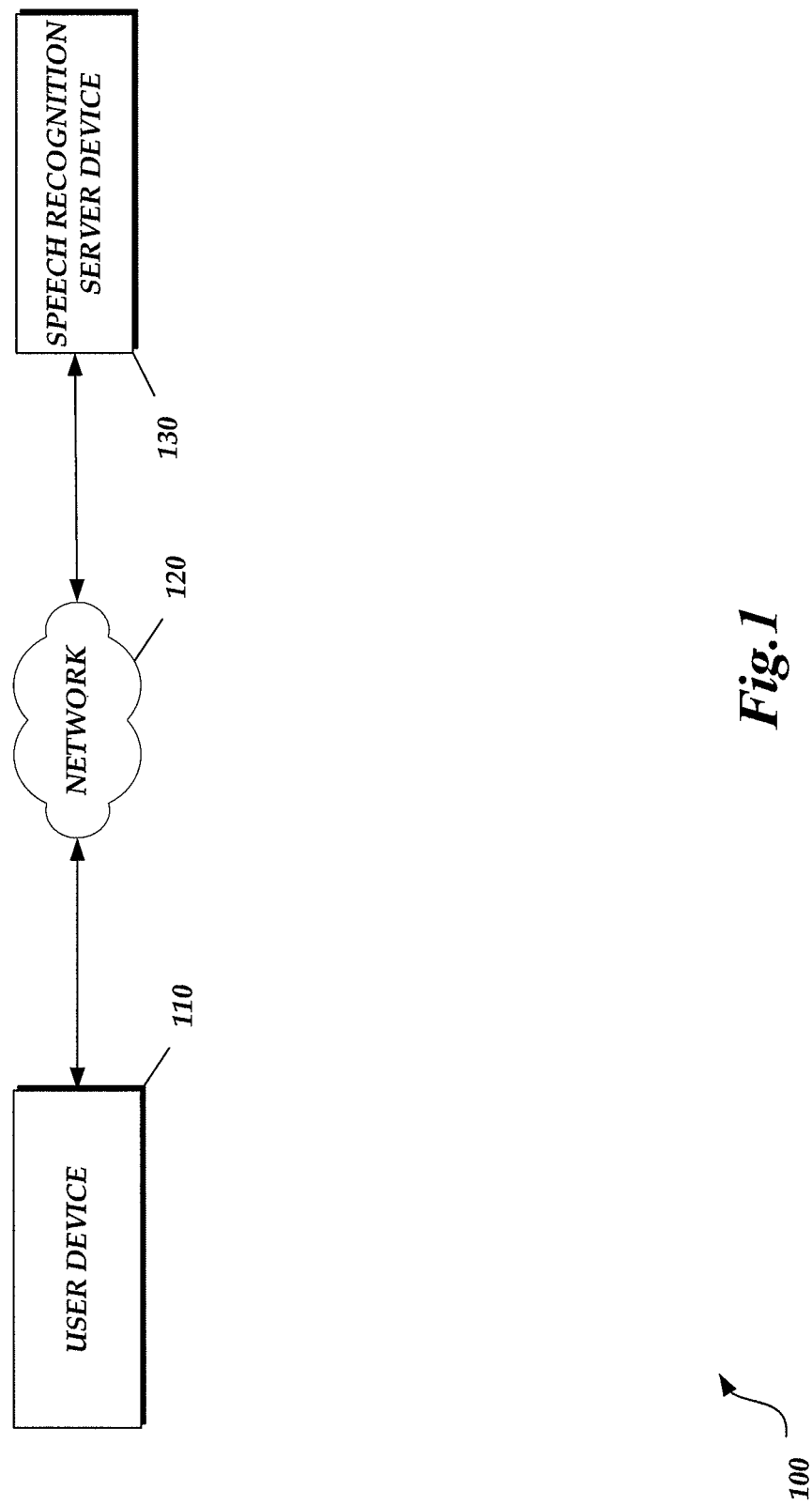
FIG. 1 is a system diagram depicting a user device in an illustrative network environment.

FIG. 1 shows a system diagram depicting a user device in an illustrative network environment. In some embodiments, the network environment 100 includes the user device 110, a network 120, and/or a speech recognition server device 130.

The user device 110 may be configured to receive a voice signal comprising an utterance and facilitate speech recognition. For example, the user device 110 may receive a voice signal comprising the utterance, forward the voice signal comprising the utterance via the network 120 to the speech recognition server device 130, and receive responses from the speech recognition server device 130, as described below. In addition, the user device may set a time marker corresponding to a point in time during the voice signal and transmit the time marker to the speech recognition server device 130. The time marker functions to identify a reference point in the voice signal. In some embodiments, the time marker can be set to the time of the internal clock of the user device 110.

In some embodiments, the speech recognition server device 130 is configured to facilitate the recognition of speech uttered by the user. For example, the speech recognition server device 130 may produce speech recognition results (e.g., a transcript, etc.) based on an utterance received from the user device 110. Accordingly, the speech recognition server device 130 can determine an end point corresponding to an end of the user utterance. Using the time marker received from the user device, the speech recognition server device 130 can determine a time offset corresponding to a difference in time between a time associated with the end point of the user utterance and a time associated with the time marker.

In determining the time offset, the speech recognition server device 130 can use the time values on its internal clock associated with the end point of the user utterance and the time marker. In determining the time offset, the internal clocks of the user device 110 and the speech recognition server device 130 do not need to be synchronized, as the time offset can be a relative time difference.

The speech recognition server device 130 may be configured to determine a response to the user utterance. The speech recognition server device 130 can transmit the time offset and the response to the user utterance to the user device 110.

In some embodiments, the user device 110 can be configured to use the time offset to determine a user-perceived latency corresponding to a difference in time between a time corresponding to an end of the user utterance and a time corresponding to when the user device receives or presents the response from the speech recognition server device 130. For example, the user device 110 can determine a time corresponding to the end of the user utterance by adding the time offset to a time on the internal clock of the user device 110 corresponding to the time marker. The user device 110 can be configured to determine a user-perceived latency by calculating the time difference between a time on the internal clock of the user device 110 corresponding to when the user device 110 receives or presents the response and the time corresponding to the end of the user utterance.

In an embodiment, the user device 110 is a computing device. For example, the user device 110 may be an electronic device, such as a cell phone, a smart phone, a tablet, a laptop, a personal digital assistant (PDA), a computer, a desktop, a workstation, an electronic book reader, a set-top box, a camera, an audiobook player, a digital media player, a video game console, a server, a terminal, a kiosk, a clock, or the like. The user device 110 may include a microphone, a speaker, a wireless module, a camera, and/or a display. In another embodiment, the user device 110 is a module or application that is executed by another device.

In another embodiment, the user device 110 is an electronic device that lacks significant computer power. For example, the user device 110 may be a device capable of capturing audio and transmitting it over a network, such as a microphone, camera, or the like.

As discussed above, the user device 110 may also be in communication with a speech recognition server device 130 directly or through a network 120. The network 120 may be a wired network, a wireless network, or a combination of the two. For example, the network 120 may be a personal area network, a local area network (LAN), a wide area network (WAN), or combinations of the same. Protocols and components for communicating via any of the other aforementioned types of communication networks, such as the TCP/IP protocols, can be used in the network 120.

The speech recognition server device 130 may be a computing device. For example, the speech recognition server device 130 may include one or more processors to execute one or more instructions, memory, and communication devices to transmit and receive data over the network 120. In some embodiments, the speech recognition server device 130 is implemented as one or more backend servers capable of communicating over a network. In other embodiments, the speech recognition server device 130 is implemented by one or more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the speech recognition server device 130 may be represented as a user computing device capable of communicating over a network, such as a laptop or tablet computer, personal computer, personal digital assistant (PDA), hybrid PDA/mobile phone, mobile phone, global positioning system (GPS) device, or the like.

While FIG. 1 illustrates a single user device 110, the speech recognition server device 130 may be in communication with a plurality of user devices 110. Likewise, while FIG. 1 illustrates a single speech recognition server device 130, the user device 110 may be in communication with a plurality of speech recognition server devices 130.

Measurement of User-Perceived Latency

Figure 2:
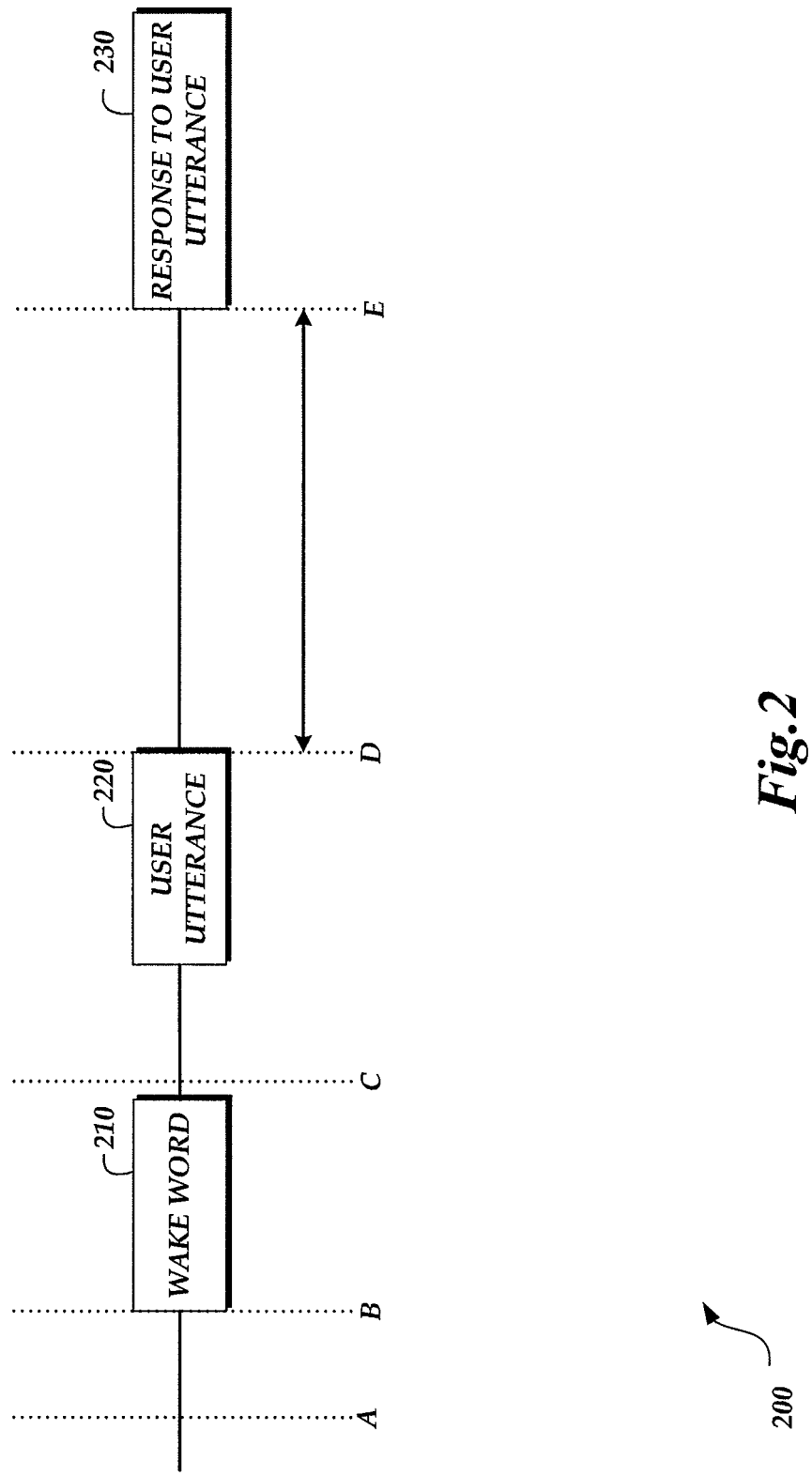
FIG. 2 is a timing diagram depicting an illustrative example of a user-perceived latency between a user utterance and a response to the user utterance.

FIG. 2 is a timing diagram depicting an illustrative example of a user-perceived latency between a user utterance and a response to the user utterance.

In some embodiments, a user device may configured to detect a wakeword 210. Detection of the wakeword 210 can cause the user device to begin receiving a voice signal. In addition, detection of the wakeword 210 can cause the user device to begin transmitting the voice signal to a server computer. In some embodiments, the wakeword 210 can be a simple word, such as "Hello," to instruct the user device to begin listening for a user utterance. Although in some embodiments, the user device may have limited resources, and generally is not configured to perform speech recognition, the user device may have the sufficient resources to perform speech recognition of one or more wakewords 210. As shown in FIG. 2, time A corresponds to a time before the user has spoken a wakeword. Time B corresponds to a time when the user has just begun to speak the wakeword 210. Time C, shortly after the user has finished speaking the wakeword 210, corresponds to a time when the user device recognizes that the user has spoken the wakeword 210. At time C, the user device can begin receiving a voice signal and transmitting the voice signal to a server computer. In some embodiments, time C may also be used as a time marker and function as a reference point in the voice signal. The user device can be configured to transmit the time marker to the server device.

In alternative embodiments, the user device may lack the speech detection capability to detect the wakeword 210. In some embodiments, the user device may be configured to begin receiving the voice signal and transmitting the voice signal to a server computer in response to a manual input from the user. For example, the user device may be configured to begin receiving the voice signal and transmitting the voice signal to a server computer in response to a user pressing a button, including a real button and/or a virtual button. In other embodiments, the user device may be configured to continuously receive the voice signal and transmit the voice signal to the server computer.

After speaking the wakeword 210, the user may begin speaking a user utterance 210. The user utterance 220 can comprise a speech request of the user to the user device. For example, a user utterance 220 could be a request to play songs by a particular music artist. Time D corresponds to the end of the user utterance 220. However, the user device generally is not configured to perform ASR. As such, the user device can be configured to continue to transmit the voice signal to the server computer.

The server device can be configured to perform speech recognition on the received voice signal. For example, the server computer may produce speech recognition results based on an utterance received from the user device. Accordingly, the server computer can determine an end point corresponding to an end of the user utterance. In other embodiments, the server computer can determine the end point corresponding to the end of the user utterance without performing speech recognition. Using the time marker received from the user device, such as a time marker corresponding to C, the server computer can determine a time offset corresponding to a difference in time between the end point of the user utterance and a time associated with the time marker. The server computer can be configured to determine a response to the user utterance. For example, the response can be text and/or audio communicating the songs found by the requested music artist, followed by playing of the songs. The server computer can transmit the time offset and the response to the user utterance to the user device. As shown in FIG. 2, time E corresponds to the time at which the user device presents the received response to the user. Alternatively, time E could be the time that the user device receives the response.

In some embodiments, using the received time offset, the user device can determine the time on its internal clock corresponding to time D. For example, the user device can determine the time D by adding the received time offset to the time C, if time C corresponds to the time marker transmitted to the server computer.

In alternative embodiments, the server computer can transmit the time corresponding to time D, based on the clock of the user device, to the user device. For example, if the time marker transmitted to the server computer is a time value corresponding to the clock on the user device, the server computer can be configured to add the time offset to the received time value to determine the time D based on the clock of the user device. Accordingly, the server computer can be configured to transmit to the user device the time D based on the clock of the user device and/or the offset.

After the user device is aware of time D, the user device can determine a user-perceived latency by subtracting time D from time E. After the user device has determined the user-perceived latency, the user device can be configured to transmit the determined user-perceived latency back to the server computer. In alternative embodiments, the user device can transmit information associated with time D to the server computer, such as the user-device time at D, and the server computer can determine the user-perceived latency.

In some embodiments, the user device ceases transmission of the voice signal to the server computer when the user devices receives the response. In other embodiments, the user device can cease transmission of the voice signal to the server computer in response to a manual input from the user. For example, the user device may be configured to cease transmission of the voice signal to the server computer in response to a user pressing a button, including a real button and/or a virtual button.

Figure 3:
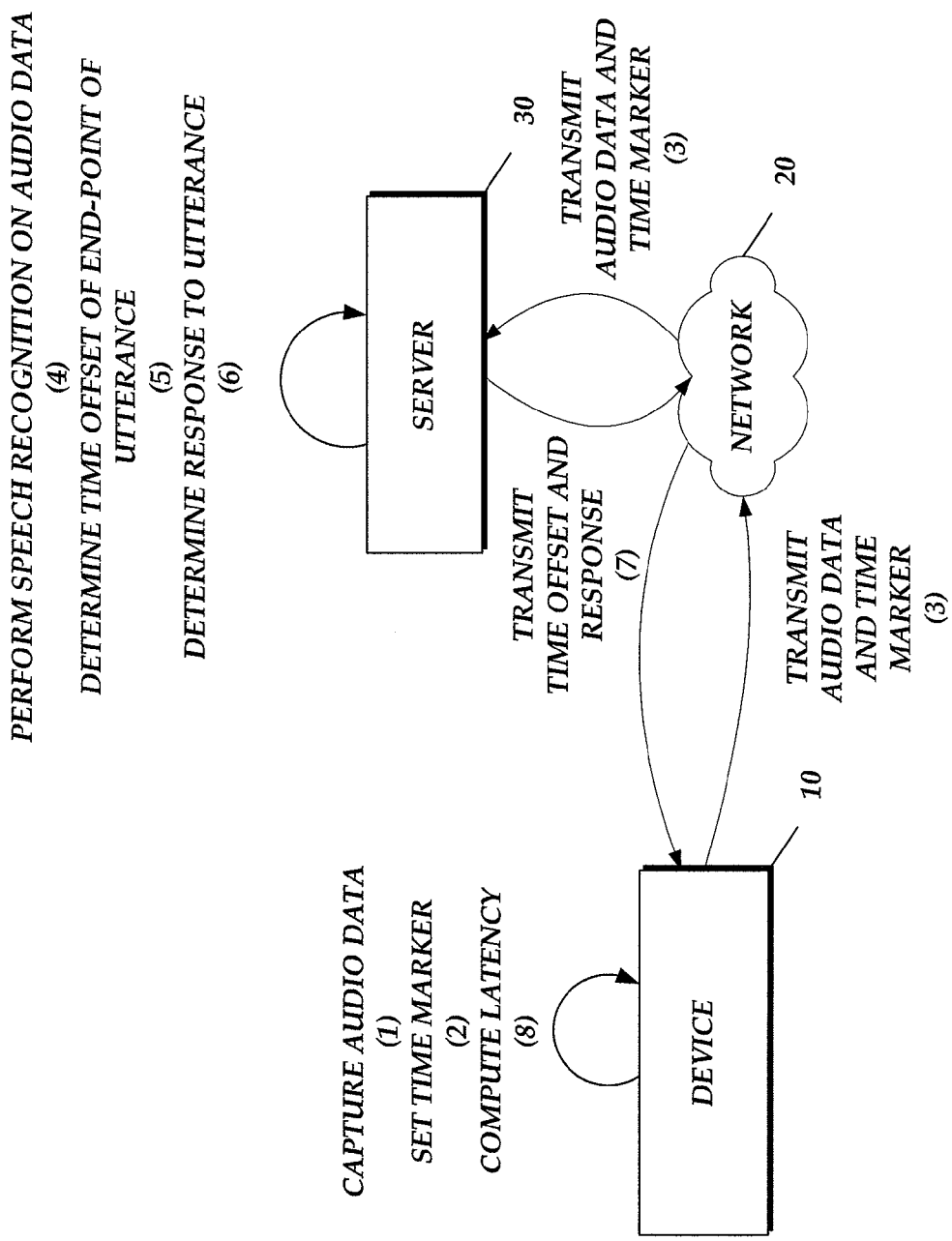
FIG. 3 is a state diagram depicting a device that uses cloud-based ASR in an illustrative network environment.

FIG. 3 illustrates a state diagram depicting a device that uses cloud-based ASR in an illustrative network environment. In the embodiment of FIG. 3, a device 10 may capture audio data (1) and set a time marker (2). The time marker (2) may correspond to the beginning of the audio data (1). For example, the time marker (2) may correspond to an initial sample of the captured audio data. The device 10 may transmit the audio data (1) and the time marker (2) to a server computer 30 via a network 20. In alternative embodiments, the device 10 does not transmit the time marker (2) to the server computer 30. For example, if the device 10 and the server computer 30 are both configured to associate the first sample of the captured audio data with the time marker, the device 10 does not necessarily need to transmit the time marker to the server computer 30.

The server computer 30 may perform speech recognition using the received audio data (4). In addition, the server computer 30 may determine an end point corresponding to an end of the user utterance. Using the received time marker, the server computer 30 may determine a time offset corresponding to the end point of the user utterance (5). In addition, the server computer 30 can be configured to determine a response to the user utterance (6). The server computer 30 can transmit the time offset and response (7) to the user device 10. In some embodiments, the time offset can include the user-device time corresponding to the end point of the user utterance, rather than a relative offset. In some embodiments, the server computer 30 also can transmit the time marker back to the user device 10. In some embodiments, the time offset and response (7) are transmitted together to the user device 10 at the same time. The device 10 can present the response to the user at a response time. The device 10 can determine a user-perceived latency using the time marker, the time offset, and the response time. In alternative embodiments, the device 10 can transmit the response time to the server computer 30, and the server computer 30 can determine the user-perceived latency.

In other embodiments, the time offset is transmitted to the user device 10 first, soon after the time offset has been determined by the server computer 30. The server computer 30 may require additional time to determine the response, and so later, once the server computer has determined the response, the server computer 30 can transmit the response to the user device. In these embodiments, the user device may need to correlate the initially-received offset with the later-received response. Accordingly, the user device 10 or server computer 30 may associate a unique identifier with the user utterance. In addition, the server computer 30 may transmit the identifier to the user device 10 along with the time offset. The server computer 30 also may transmit the identifier to the user device 10 along with the response. By comparing the received identifiers, the user device 10 can correlate a received time offset with a received response.

User-Perceived Latency Determined by User Device

Figure 4:
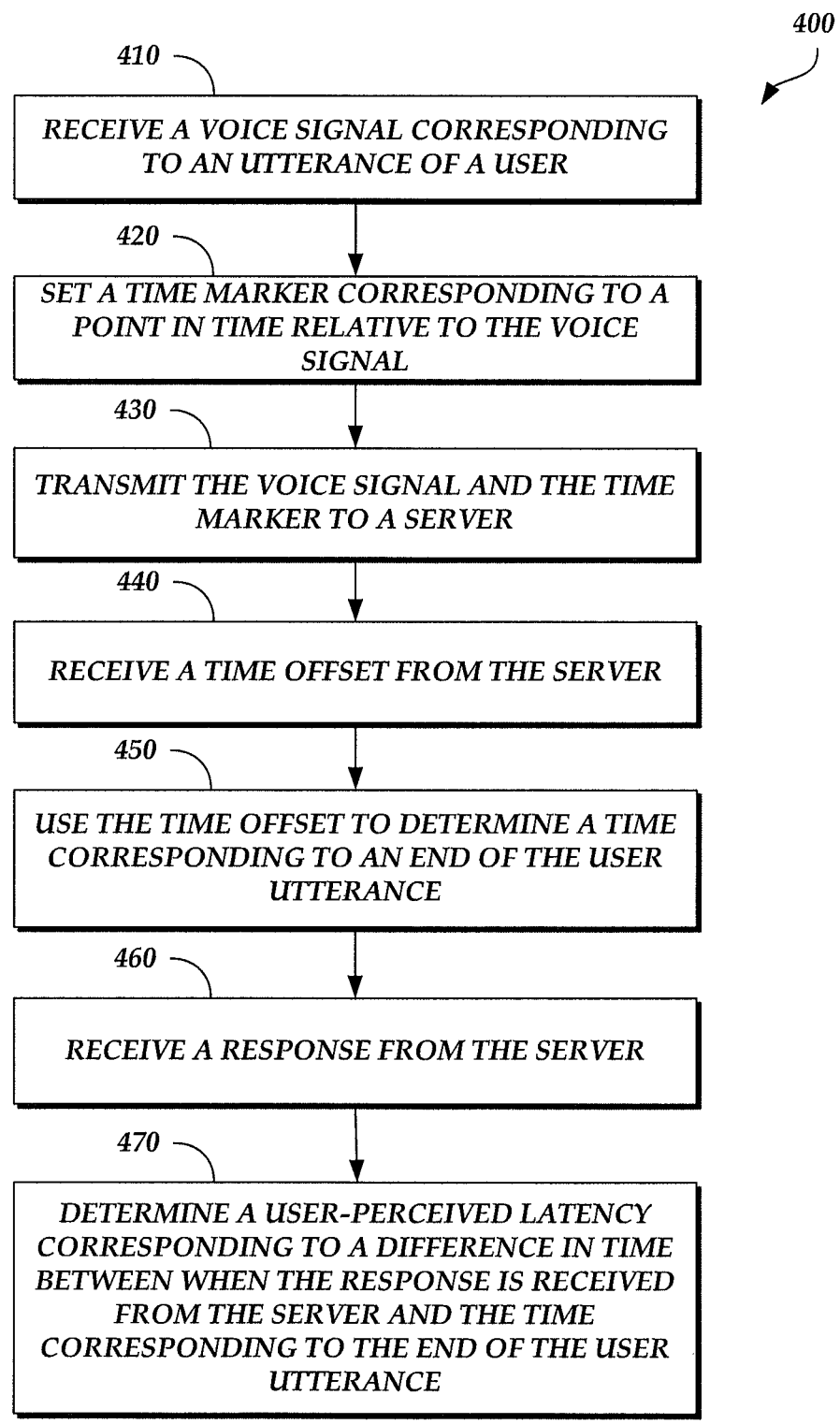
FIG. 4 is a flow diagram depicting an illustrative routine for determining a user-perceived latency.

In an embodiment, the user device can determine a user-perceived latency, as described in more detail below with respect to FIG. 4. FIG. 4 is a flow diagram depicting an illustrative routine for determining a user-perceived latency. In particular, FIG. 4 illustrates a routine 400 from the perspective of the user device for determining a user-perceived latency. A user device, as described herein with respect to FIGS. 1-3, may be configured to execute the routine 400. The routine 400 can begin at block 410.

At block 410, a voice signal corresponding to an utterance of a user is received. The utterance may be received for the purposes of performing speech recognition. After block 410, the routine 300 may proceed to block 420.

At block 420, a time marker corresponding to a point in time during the voice signal may be set. The time marker can function to identify a reference point in the voice signal. In some embodiments, the time marker can be set according to the time of the internal clock of the user device.

In some embodiments, the time marker may correspond to an initial sample of the received audio data. In other embodiments, the time marker may correspond to another sample of the received audio data. The time marker may include an identifier of an audio sample, and/or the time marker may include a time on the user device corresponding to an audio sample.

At block 430, the voice signal and the time marker can be transmitted by the user device to the server computer. For example, the voice signal and the time marker may be transmitted to a speech recognition server device.

In some embodiments, the user device only transmits the voice signal, but not the time marker, at block 430. For example, if the user device and the server computer are both configured to associate the first sample of the received audio data with the time marker, the user device does not necessarily need to transmit the time marker to the server computer.

In alternative embodiments, the user device may also associate a unique identifier with the user utterance at block 420 and transmit the identifier to the server device at block 430.

In an embodiment, the speech recognition server device may perform speech recognition using the voice signal and the time marker. The speech recognition server device can determine an end point corresponding to an end of the user utterance using the speech recognition performing using the voice signal. Using the received time marker, the speech recognition server device may determine a time offset corresponding to the end point of the user utterance. In addition, the speech recognition server device can be configured to use the performed speech recognition to assist in determining a response to the user utterance. In some embodiments, the speech recognition server device can return the response to the user utterance and the time offset corresponding to the end point of the user utterance to the user device.

At block 440, the time offset corresponding to the end point of the user utterance is received by the user device. To determine the user-device time corresponding to the end of the user utterance, at block 450, the time offset can be used to determine the user-device time corresponding to the end of the user utterance. For example, the user device can add the time offset to the user-device time corresponding to the time marker to determine the user-device time corresponding to the end of the user utterance.

In other embodiments, instead of receiving a time offset from the speech recognition server device, the user device can receive the user-device time corresponding to the end of the user utterance. For example, if the time marker is configured to include the corresponding user-device time, the speech recognition server device may determine the user-device time corresponding to the end of the user utterance by adding the time offset to the user-device time corresponding to the time marker.

At block 460, the response to the user utterance is received from the speech recognition server device. In some embodiments, block 460 occurs at or about the same time as block 440. For example, the user device may receive the time offset and response together in the same transmission from the speech recognition server device. In these embodiments, because the time offset and response are received together in the same transmission, the user device is informed that the time offset and response are both correlated with the same utterance.

At block 470, a user-perceived latency can be determined corresponding to a difference in time between the user-device time when the response received from the speech recognition server device is presented to the user and the user-device time corresponding to the end of the user utterance. After calculating the user-perceived latency, in some embodiments, the user device can transmit the determined user-perceived latency to the speech recognition server device. Alternatively, at block 470, the user device can transmit to the speech recognition server device a user-device time corresponding to when the response received from the speech recognition server device is presented to the user, and the speech recognition server device can determine the user-perceived latency.

In alternative embodiments, after the user device determines the user-device time at which the user device receives the response from the speech recognition server device, the user device can transmit the user-device time at which the user device receives the response to the speech recognition server device. If the time marker is configured to include the corresponding user-device time, the speech recognition server device has sufficient information to determine the user-perceived latency on the speech recognition server device. For example, in these embodiments, the speech recognition server device may determine a user-perceived latency by subtracting the user-device time corresponding to the time marker and the time offset from the user-device time at which the user device receives the response.

In other alternative embodiments, the user device is configured to be able to receive a time offset from the speech recognition server device at different times than the user device receives the response from the server. For example, the user device may be configured to receive a time offset at block 440 before receiving a response from the speech recognition server device at block 460. Because the user device can be configured to receive the time offsets and responses at different times, the user device preferably can correlate which received time offsets are associated with which received responses. For example, the speech recognition server device can be configured to associate a unique identifier with each user utterance. If the unique identifier is included with each transmission of a time offset or response, the user device can correlate each time offset to each response. After the user device receives a correlated pair of time offset and response, the user device can determine the user-perceived latency, as described above.

Time Offset and Response Determined by Server Computer

Figure 5:
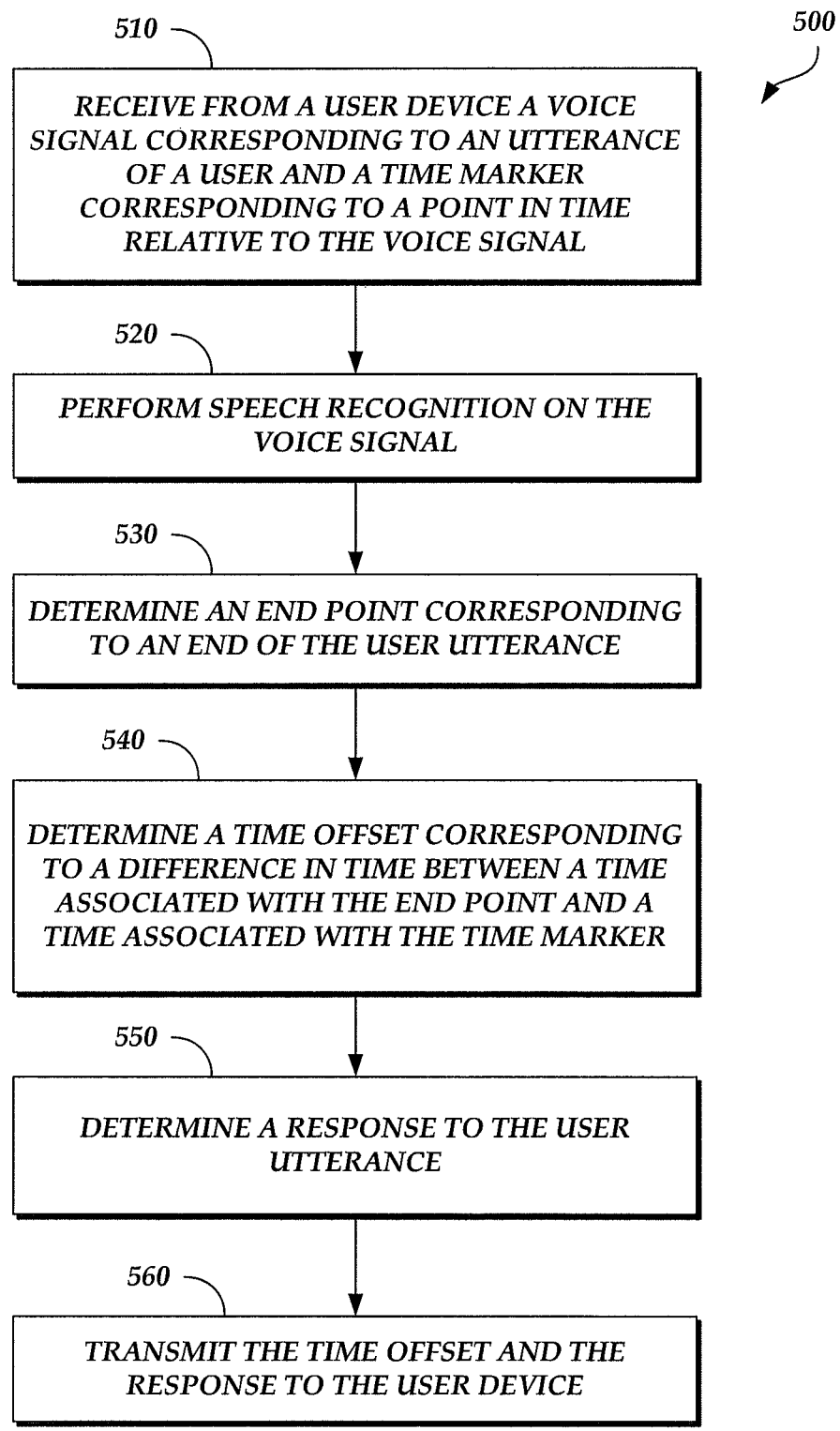
FIG. 5 is a flow diagram depicting an illustrative routine for determining a time offset corresponding to an end point of a user utterance.

In an embodiment, the server computer may determine a time offset corresponding to an end of a user utterance and a response to that utterance, based on an utterance received by user device 110, as described below with respect to FIGS. 5 and 6. In particular, FIG. 5 is a flow diagram depicting an illustrative routine for determining a time offset corresponding to an end point of a user utterance. A server computer, as described herein with respect to FIGS. 1-3, may be configured to execute the routine 500.

The routine 500 can begin at block 510. At block 510, a voice signal corresponding to an utterance of a user may be received from a user device. In addition, a time marker corresponding to a point in time related to the voice signal is received from a user device at block 510. For example, the time marker may correspond to a point in time during, before, at the beginning of, and/or after the user utterance.

In some embodiments, the time marker may correspond to an initial sample of the received audio data (e.g., a point in the voice signal having a relative offset of zero). In other embodiments, the time marker may correspond to any other sample of the received audio data. The time marker may include an identifier of an audio sample, and/or the time marker may include a time on the user device corresponding to an audio sample.

In some embodiments, at block 510, the server computer only receives the voice signal, but not the time marker. For example, if the user device and the server computer are both configured to associate the first sample of the received audio data with the time marker, the server device does not necessarily need to receive the time marker.

In alternative embodiments, at block 510, the server computer may also receive a unique identifier associated with the user utterance. The server computer can then include the unique identifier when transmitting the time offset and the response at block 560.

At block 520, the server computer can perform speech recognition on the voice signal. For example, the server computer can determine text corresponding to the user utterance. In addition, the server computer can apply a NLU process to understand and make sense of the user utterance.

At block 530, the server computer can determine an end point corresponding to an end of the user utterance. In some embodiments, the server computer performs block 530 before block 520, and the server computer determines an en point corresponding to an end of the user utterance before performing speech recognition. At block 540, the server computer can determine a time offset corresponding to a difference in time between a time associated with the end point and a time associated with the time marker. For example, the server computer can determine a time offset corresponding to a time difference between a server-computer time associated with the end point and a server-computer time associated with the time marker. Because the offset can be calculated as a relative time difference, internal clocks on the user device and the server computer do not need to be synchronized.

At block 550, the server computer determines a response to the user utterance. At block 560, the server computer transmits the time offset to the user device. In addition, the server computer transmits the response to the user utterance to the user device. In some embodiments, the server computer may transmit the time offset and the response to the user utterance in the same transmission, at approximately the same time.

In some embodiments, instead of sending a time offset to the user device, the server computer can send the user-device time corresponding to the end of the user utterance. For example, if the time marker is configured to include the corresponding user-device time, the server computer may determine the user-device time corresponding to the end of the user utterance by adding the time offset to the user-device time corresponding to the time marker.

Lastly, the server computer can receive from the user device a user-perceived latency corresponding to a difference in time between when the response is presented to the user and a user-device time corresponding to the end of the user utterance. Alternatively, the server computer can receive a user-device time corresponding to when the response is presented to the user, and server computer can determine the user-perceived latency.

Figure 6:
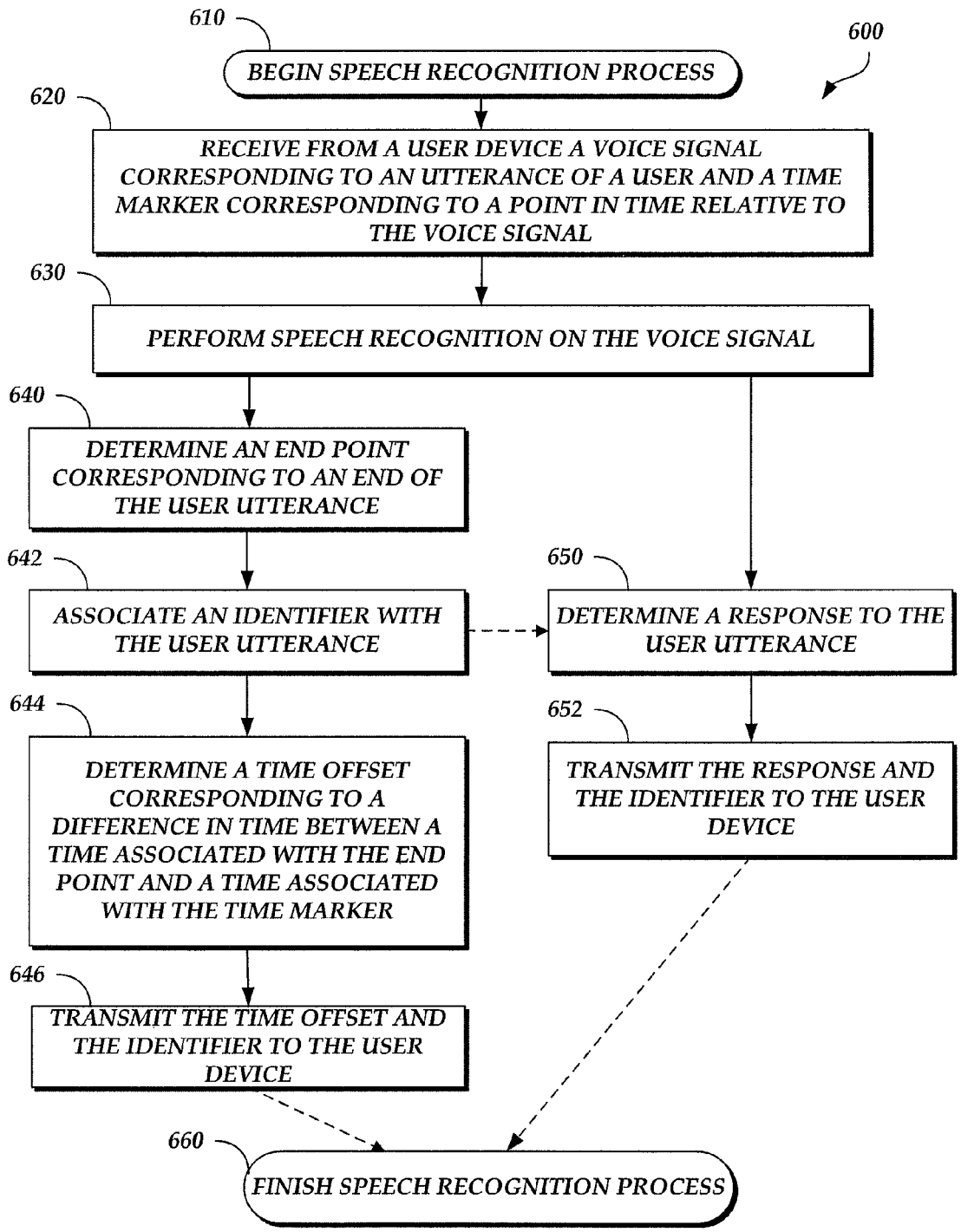
FIG. 6 is a flow diagram depicting another illustrative routine for determining a time offset corresponding to an end point of a user utterance.

FIG. 6 is a flow diagram depicting an illustrative routine for determining a time offset corresponding to an end point of a user utterance. A server computer, as described herein with respect to FIGS. 1-3, may be configured to execute the routine 600.

The routine 600 can begin at 610. At block 620, a voice signal corresponding to an utterance of a user may be received from a user device. In addition, a time marker corresponding to a point in time related to the voice signal can be received from a user device at block 620. For example, the time marker may correspond to a point in time during, before, at the beginning of, and/or after the user utterance.

In some embodiments, the time marker may correspond to an initial sample of the received audio data (e.g., a point in the voice signal having a relative offset of zero). In other embodiments, the time marker may correspond to any other sample of the received audio data. The time marker may be an identifier of an audio sample, or the time marker may be a time on the user device corresponding to an audio sample.

In some embodiments, at block 620, the server computer only receives the voice signal, but not the time marker. For example, if the user device and the server computer are both configured to associate the first sample of the received audio data with the time marker, the server device does not necessarily need to receive the time marker.

In alternative embodiments, at block 620, the server computer may also receive a unique identifier associated with the user utterance. In such embodiments, the server computer can omit performing block 642, as the server computer has received the identifier from the user device.

At block 630, the server computer can perform speech recognition on the voice signal. For example, the server computer can determine text corresponding to the user utterance. In addition, the server computer can apply a NLU process to understand and make sense of the user utterance. If a voice signal includes more than one user utterance, the server computer can perform speech recognition to recognize each user utterance.

At block 640, the server computer can determine an end point corresponding to an end of the user utterance. At block

642, the server computer can associate a unique identifier with the user utterance. For each user utterance the server computer identifies, the server computer can associate a unique identifier, such that no two user utterances share the same identifier.

In some embodiments, at block 642, the server computer also can transmit the identifier to the user device. In addition, the server computer can transmit the identifier to the user device as soon as it is determined. For example, the server computer can associate the identifier with the utterance as soon as the voice signal is received, at block 620, and can transmit the identifier to the user device at that time.

At block 644, the server computer can determine a time offset corresponding to a difference in time between a time associated with the end point and a time associated with the time marker. For example, the server computer can determine a time offset corresponding to a time difference between a server-computer time associated with the end point and a server-computer time associated with the time marker. Because the offset can be calculated as a relative time difference, internal clocks on the user device and the server computer do not need to be synchronized.

At block 646, the server computer can transmit the time offset for a user utterance and utterance identifier to the user device in a single transmission. Often, the server computer can determine the time offset for a user utterance more quickly than it can determine a response to the user utterance. In some embodiments, the server computer transmits the time offset to the user device as soon as the time offset has been determined. By including the identifier with the transmission, the server computer allows the user device to be able to correlate the time offset with a response.

At block 650, the server computer can determine a response to the user utterance. At block 652, the server computer can transmit the response to the user utterance and utterance identifier to the user device in a single transmission.

In some embodiments, instead of sending a time offset to the user device, the server computer can send the user-device time corresponding to the end of the user utterance. For example, if the time marker is configured to include the corresponding user-device time, the server computer may determine the user-device time corresponding to the end of the user utterance by adding the time offset to the user-device time corresponding to the time marker.

Lastly, the server computer can receive from the user device a user-perceived latency corresponding to a difference in time between when the response is presented to the user and a user-device time corresponding to the end of the user utterance. Alternatively, the server computer can receive a user-device time corresponding to when the response is presented to the user, and server computer can determine the user-perceived latency.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a user device configured to:
receive a voice signal corresponding to an utterance of a user;
determine a first time corresponding to a first point in the voice signal,
wherein the first time corresponds to a user-device time;
transmit the voice signal to a server device over a network, wherein the server device is configured to:
perform speech recognition using the voice signal;
determine a second point corresponding to an end of the utterance;
determine a time offset corresponding to a difference in time between the second point and the first point;
determine a response to the utterance using results of the speech recognition; and
transmit the time offset and the response to the user device;
receive the time offset and the response from the server device;
present the response to the user;
determine a second time corresponding to time at which the user device presents the response to the user, wherein the second time corresponds to a user-device time; and
determine a latency using the first time, the time offset, and the second time.

2. The system of claim 1, wherein the first point corresponds to a first sample of the voice signal and wherein the user device is further configured to transmit the first time to the server device.

3. The system of claim 1, wherein the user device is further configured to receive the voice signal in response to a manual input from the user.

4. The system of claim 1, wherein the user device is further configured to stream the voice signal to the server device.

5. The system of claim 1, wherein the server device is further configured to transmit the time offset to the user device prior to transmitting the response to the user device.

6. The system of claim 1, wherein the utterance is associated with an identifier and wherein the user device is further configured to use the identifier to associate the first time with the second time.

7. A computer-implemented method, comprising:
as implemented by one or more computing devices configured with specific computer-executable instructions,
receiving a voice signal corresponding to an utterance of a user;
determining a first time corresponding to a first point in the voice signal;
transmitting the voice signal to a server device over a network, wherein the server is configured to perform speech recognition using the voice signal;
receiving a time offset from the server device;
receiving a response from the server device;
presenting the response to the user at a second time;
determining a latency using the first time, the second time, and the time offset.

8. The computer-implemented method of claim 7, wherein the first point corresponds to a first sample of the voice signal.

9. The computer-implemented method of claim 7, further comprising detecting a wake word spoken by the user, wherein the voice signal is transmitted in response to detection of the wake word.

10. The computer-implemented method of claim 7, further comprising streaming the voice signal to the server device.

11. The computer-implemented method of claim 7, wherein the time offset and the response are received at approximately the same time.

12. The computer-implemented method of claim 7,
wherein the server generates an identifier associated with the utterance; and
wherein receiving the response comprises receiving the identifier from the server.

13. The computer-implemented method of claim 7, further comprising:
associating an identifier with the utterance; and
transmitting the identifier to the server device.

14. The computer-implemented method of claim 7, further comprising transmitting the first time to the server device.

15. A computer-implemented method, comprising:
as implemented by one or more computing devices configured with specific computer-executable instructions,
receiving, from a user device, a voice signal corresponding to an utterance of a user;
performing speech recognition on the voice signal;
determining an end point corresponding to an end of the utterance;
transmitting information relating to the end of the utterance to the user device;
determining a response to the utterance using results of the speech recognition;
transmitting the response to the user device; and
receiving, from the user device, a latency, wherein the user device computes the latency using the information relating to the end of the utterance, and wherein the latency corresponds substantially to an amount of time between the end of the utterance and presentation by the user device of the response.

16. The computer-implemented method of claim 15, further comprising receiving a first time corresponding to a point in the voice signal.

17. The computer-implemented method of claim 15, wherein the first time corresponds to a beginning of the user utterance.

18. The computer-implemented method of claim 15, wherein the information relating to the end of the utterance is transmitted before the response is transmitted.

19. The computer-implemented method of claim 15, further comprising:
associating an identifier with the utterance;
transmitting the identifier with the information relating to the end of the utterance to the user device; and
transmitting the identifier with the response to the user device.

20. The computer-implemented method of claim 15, further comprising receiving, with the voice signal, an identifier associated with the utterance.

* * * * *